United States Patent [19]
Ueno et al.

[11] Patent Number: 5,393,147
[45] Date of Patent: Feb. 28, 1995

[54] TAPE PRINTING DEVICE FOR PRINTING CHARACTERS AND FRAMES

[75] Inventors: Hideo Ueno; Shoji Sakuragi, both of Nagoya; Akihiko Niwa, Toki, all of Japan

[73] Assignee: Brother Kogyo Kabushiki Kaisha, Nagoya, Japan

[21] Appl. No.: 978,437

[22] Filed: Nov. 18, 1992

[30] Foreign Application Priority Data

Dec. 26, 1991 [JP] Japan ................................ 3-358987

[51] Int. Cl.[6] .............................................. B41J 3/46
[52] U.S. Cl. ......................................... 400/65; 400/83; 400/615.2
[58] Field of Search ................. 400/61, 68, 76, 615.2, 400/83, 17, 21, 65

[56] References Cited

U.S. PATENT DOCUMENTS

| | | | |
|---|---|---|---|
| 4,623,418 | 11/1986 | Gombrich et al. | 400/68 |
| 4,906,114 | 3/1990 | Tanaka et al. | 400/17 |
| 4,966,476 | 10/1990 | Kuzuya et al. | 400/208 |
| 5,123,758 | 6/1992 | Uematsu | 400/76 |

FOREIGN PATENT DOCUMENTS

| | | | |
|---|---|---|---|
| 2133865 | 5/1990 | Japan | 400/68 |
| 2133866 | 5/1990 | Japan | 400/68 |
| 2120821 | 12/1983 | United Kingdom | 400/68 |

*Primary Examiner*—David A. Wiecking
*Assistant Examiner*—Steven S. Kelley
*Attorney, Agent, or Firm*—Oliff & Berridge

[57] ABSTRACT

An operator inputs characters from a keyboard. The characters are stored in the form of character codes. The operator sets an overall frame and a partial frame to decide characters to be enclosed in the frames by editing character codes symbolically displayed on the liquid crystal display. In this process, both ends of the frames are also encoded into character codes. After the operator enters an execution key, the character codes are converted into bit image data by means of a character generator. The image data for characters, the overall frame and the partial frame are combined on the image buffer. When the image data is ready, the image data is transferred to the thermal head via a driving circuit, and the printing process is executed on a printing medium. An array of printing mechanisms substantially extending across the width of the tape printing medium allow the printing device to execute the whole printing process while sending the medium in one direction.

18 Claims, 12 Drawing Sheets

| START | |
|---|---|
| S1 | INITIALIZE |
| S2 | KEY INPUT? |
| S3 | CHARACTER KEY OR EDIT KEY OPERATED? |
| S4 | INPUT OR EDIT CHARACTER DATA |
| S5 | PARTIAL FRAMING SET? |
| S6 | PERFORM PARTIAL FRAME SETTING PROCESS |
| S7 | PRINT EXECUTION? |
| S8 | SETTING OVERALL FRAME |
| S9 | PERFORM PRINTING PROCESS |
| S10 | OTHER PROCESS |

FIG. 9B

| PARTIAL FRAME SETTING PROCESS | |
|---|---|
| S21 | DISPLAY CHARACTER AT CURSOR POSITION IN REVERSE COLOR |
| S22 | KEY INPUT? |
| S23 | CURSOR-LEFT KEY OR CURSOR-RIGHT KEY INPUT? |
| S24 | CURSOR CAN MOVE FARTHER? |
| S25 | ALARM |
| S26 | DISPLAY CHARACTER AT NEW CURSOR POSITION IN REVERSE COLOR |
| S27 | EXECUTION KEY INPUT? |
| S28 | INSERT PARTIAL FRAMING MARK ON BOTH BORDERS OF REVERSED AREA |
| S29 | TURN CHARACTERS IN REVERSE COLOR INTO NORMAL COLOR |
| RETURN | |

| PRINTING PROCESS | |
|---|---|
| S41 | CLEAR IMAGE BUFFER |
| S42 | OVERALL FRAME SET? |
| S43 | RESERVE TOP AREA OF IMAGE BUFFER |
| S44 | READ DATA |
| S45 | PARTIAL FRAME DATA? |
| S46 | DRAW CHARACTER PATTERN ON IMAGE BUFFER |
| S47 | DRAW VERTICAL LINES OF PARTIAL FRAME ON IMAGE BUFFER |
| S48 | NEXT DATA? |
| S49 | PARTIAL FRAME DATA? |
| S50 | DRAW HORIZONTAL LINES OF PARTIAL FRAME ON IMAGE BUFFER |
| S51 | OVERALL FRAME? |
| S52 | DRAW OVERALL FRAME ON IMAGE BUFFER |
| S53 | PRINT EXECUTION |
| RETURN | |

TAPE PRINTING DEVICE FOR PRINTING CHARACTERS AND FRAMES

BACKGROUND OF THE INVENTION

1. Field of the Invention

The present invention relates to a printing device, and more particularly to a printing device that can print relatively simple contents of text (e.g. words or names) on a tape printing medium (e.g. labels).

2. Description of Related Art

Lately, tape printing devices that can print desired characters or marks on labels (e.g. paper labels, plastic film labels) have been available. These devices consist of an input operation unit with a liquid crystal display and a group of character keys and function keys and a printing unit for controlling a printing head while feeding paper mediums in a direction (e.g. horizontally). With these devices, operators can acquire printed mediums by pushing an execution key after having input desired characters by means of a keyboard and checked their operations on a display.

However, these conventional printing devices can print only letters on labels, which represent a limited impression. Thus, printing devices have been proposed which enclose entire characters to enhance the impression or emphasize the text.

Conventional printing devices with a framing function to enclose entire characters have been available. However, with these devices, operators have to make a choice between only two options, that is, whether the entire text should be enclosed or not. Therefore, it is impossible to enclose a section of the text to be emphasized.

SUMMARY OF THE INVENTION

An object of the present invention is to provide a printing device with a novel emphasis function which can execute printing with a variety of versatile impressions.

To achieve the foregoing and other objects, and to overcome the shortcomings discussed above, the present invention provides a tape printing device for printing characters and frames enclosing entire characters or part of characters comprising: a character input means for inputting characters and various commands for controlling functions of the tape printing device; an overall frame setting means for setting an overall frame which encloses all the characters; a partial frame setting means for setting at least one partial frame which encloses a part of the characters; and a printing means for printing characters, an overall frame, and partial frames on said medium according to the conditions indicated by the overall and partial frame setting means.

According to the above-described constitution, characters to be printed on a medium are input by the character input means. Furthermore, operators can set an overall frame which encloses all of the characters and a plurality of partial frames which enclose some of the characters.

Referring to a condition indicated by the overall frame setting means and partial frame setting means, the printing means executes printing on a tape medium with two-way framing options.

Accordingly, the printing device can print on a tape medium not only characters but also such optional frames as an overall frame, a partial frame or both frames so as to give printed mediums various impressions.

DETAILED DESCRIPTION OF PREFERRED EMBODIMENTS

Figure 1:
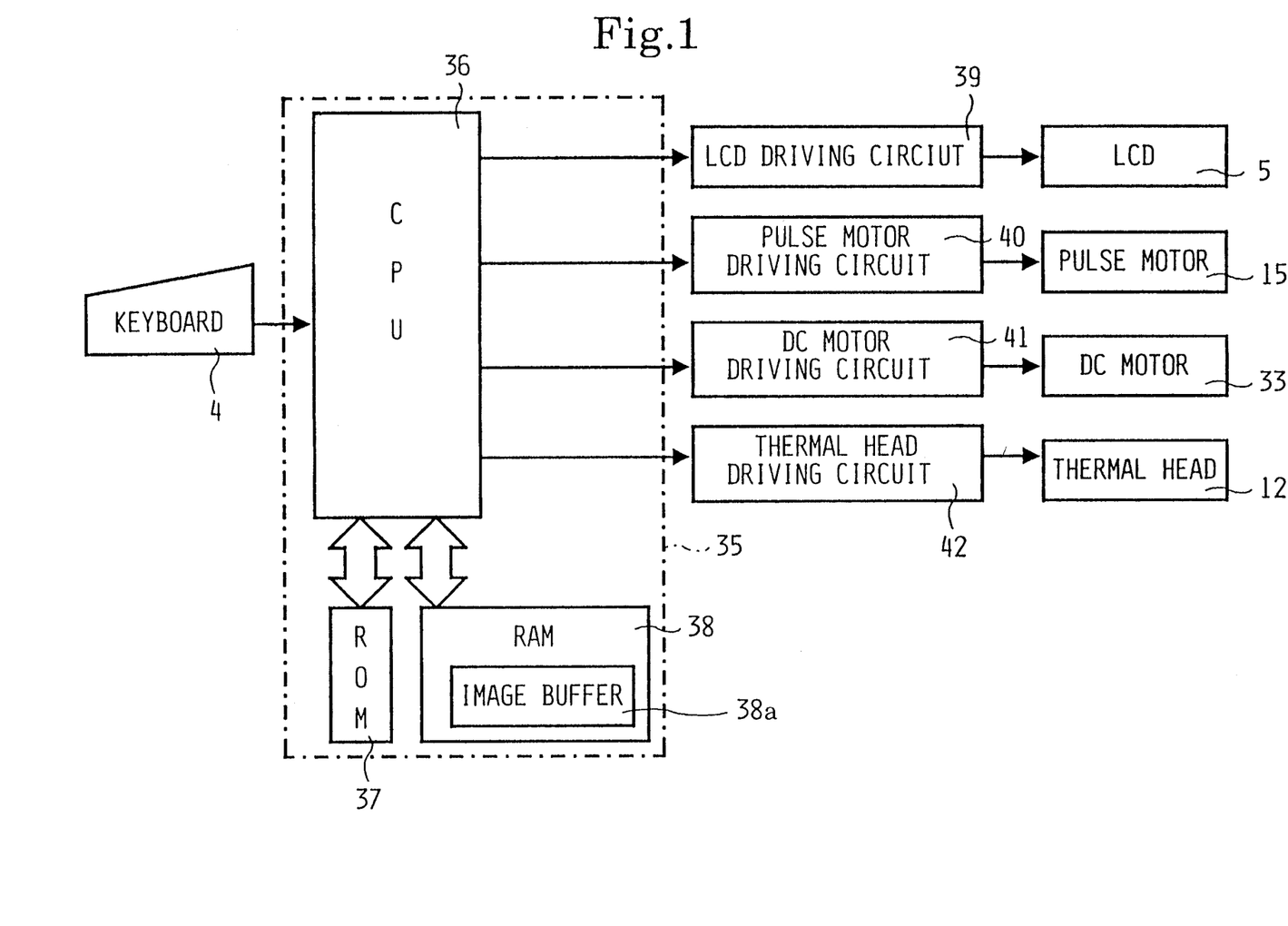
FIG. 1 is a block diagram of a control device which controls functions of a printing device.
Figure 2:
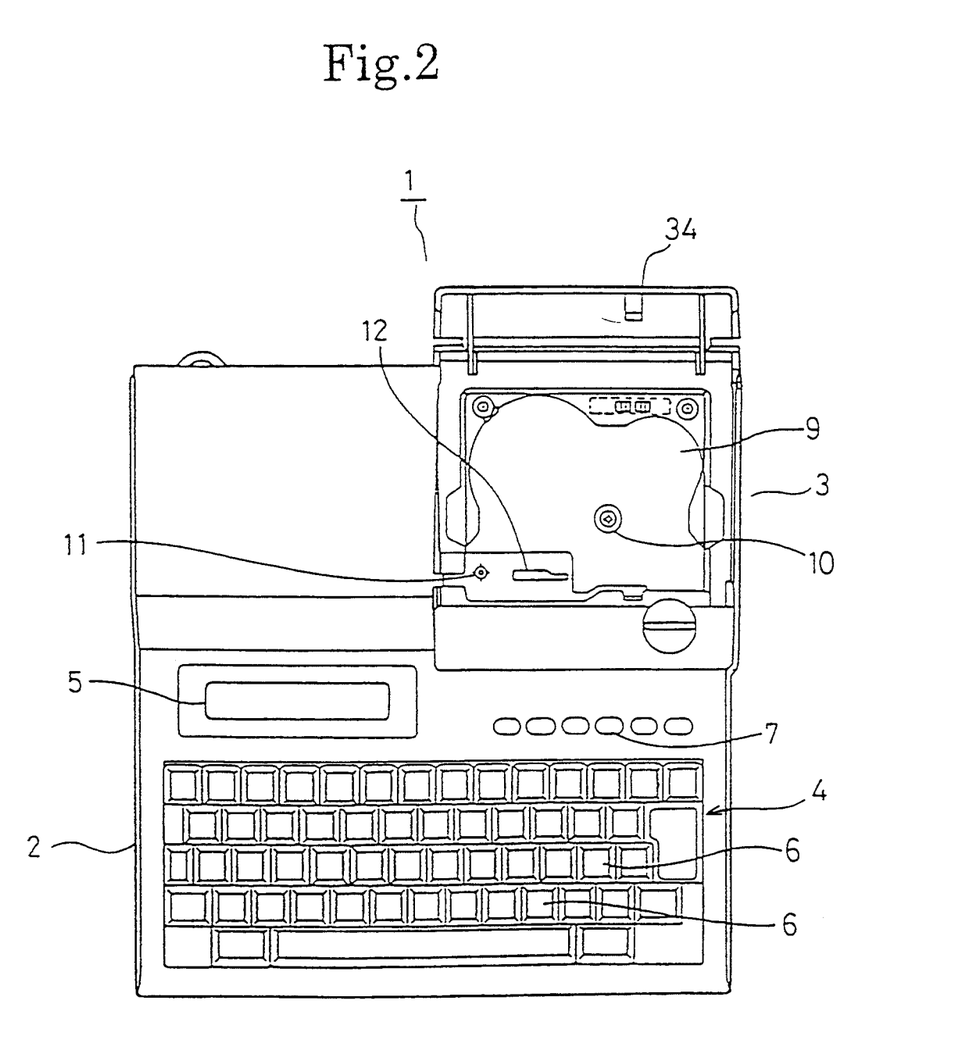
FIG. 2 is a plan view of a printing device with a tape cassette detached.
Figure 3:
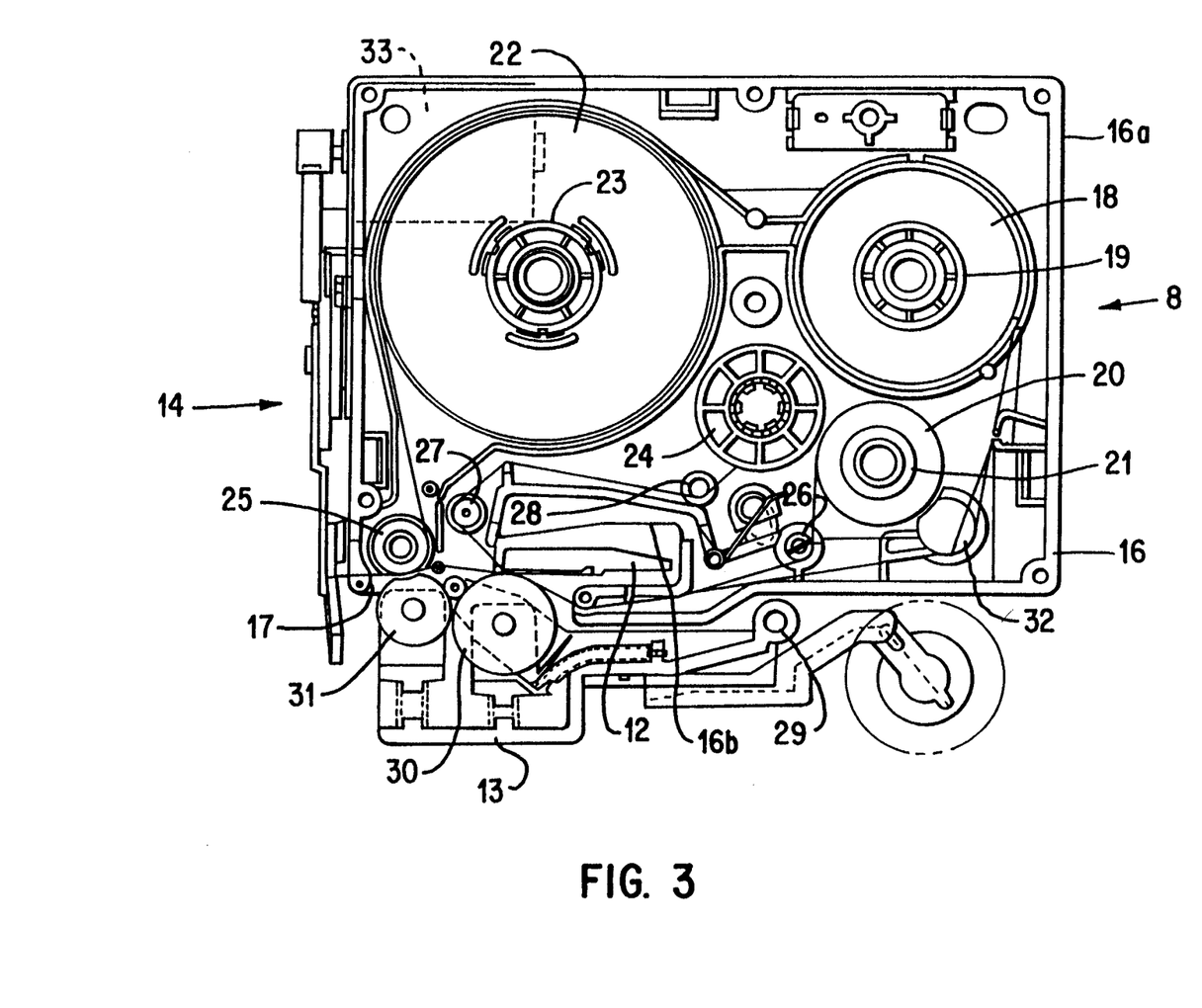
FIG. 3 is an enlarged plan view in partial section of a tape cassette.

A preferred embodiment of the present invention will now be described with reference to the figures. FIGS. 1 through 3 give brief illustrations of the structure of a tape printing device, which is the preferred embodiment of the invention. Referring to FIG. 2 which is a view of the body 1 of the printing device, the body 1 consists of two prime units including an input operation unit in the front and a printing unit in the rear.

The input operating unit 2 has a keyboard 4 and an LCD (liquid crystal display) 5. The keyboard 4 has a number of character keys 6 for inputting characters including alphabetic and numeric letters and various marks. The keyboard also has a plurality of function keys 7 including a cursor key, a printing execution key, a partial frame setting key and an execution key.

The LCD 5 displays characters input from the keyboard 4 and various messages. The function of the LCD complements the function of the operating unit 2 as a character data input means.

The printing unit 3 has a tape cassette installation unit 9 which can accommodate an exchangeable tape cassette 8. The tape cassette installation unit 9 has a ribbon winding up shaft 10, a tape sending shaft 11, a thermal head 12, a roller holder 13, and a cutter mechanism 14 as illustrated in FIG. 3.

The ribbon winding up shaft 10 and tape sending shaft 11 are driven by the pulse motor 15 (illustrated only in FIG. 1). The thermal head 12 is for a printing purpose on a printing media, and can be formed by a thermal device array set on a column.

A detailed illustration of the tape cassette 8 is shown in FIG. 3 which is a view of the tape cassette 8 installed in the tape cassette installation unit 9 with its upper case removed. The tape cassette consists of the case 16 comprising an upper case, a lower case 16a and the following mechanisms.

The case 16, as a whole, is in the form of a rectangular box, which has an aperture 17 on the left side of the front face (lower face in FIG. 3). A tape spool 19 around which a printing medium 18 (e.g. long scale transparent tape film) is wound is rotatably positioned in the upper-right side in FIG. 3. Also positioned in the lower side is a ribbon spool 21 on which long scale thermal ribbon 20 is wound. On the left side of the FIG. 3 is an adhesive tape spool 23 positioned rotatably on which long scale double sided adhesive tape 22 with a releasable paper only on its outer side is wound.

Below the double sided adhesive tape spool 23 is the aperture 16b, in which the thermal head 12 is inserted through. The contact roller 25 is positioned in the lower left corner of FIG. 3. A ribbon winding up spool 24 is located in the middle of the FIG. 3.

The ribbon winding up spool 24 is connected to the ribbon winding up shaft 10 and is rotated. A thermal ribbon 20 drawn out by a mechanism in the tape printing device and is sent to the thermal head 12 along guide rollers 26, 27 for printing, and is wound up by the ribbon winding up spool 24.

Meanwhile, as shown in FIG. 3, a roller holder 13 is located in the front of the tape cassette 8 and is rotatably installed around the shaft 29 at its rightmost part between a set position and a release position where its leftmost part is released from the tape cassette 8. The roller holder 13 has a platen roller 30 and a tape sending roller 31 installed on its left part.

The platen roller 30 contacts the thermal head 12 and receives film 18 and thermal ink ribbon 20 at the set position. The tape sending roller 31 contacts against the contact roller 25 and connects to the tape sending shaft 11 in the tape printing device so that it sends film 18 and double sided adhesive tape 22 out of the case 16 through aperture 17.

The film 18 drawn out from the tape spool 19 by the tape sending shaft 11 engaging with the tape sending roller 31 hangs around the guide roller 32, and is overlapped with the thermal ink ribbon 20 before it is sent to between the thermal head 12 and platen roller 30 for printing desired characters thereon.

After printing at the thermal head 12, the film 18 on which printing was executed is separated from the thermal ink ribbon 20, then overlapped with the double-sided adhesive tape 22 drawn out from the adhesive tape spool 23, and sent through between the contact roller 25 and tape sending roller 31 to be released from the left-most part of the aperture 17 of the case 16. A double-sided adhesive tape 22 with a releasable paper on its back is secured to the back of the film 18 in this process.

The cutter mechanism 14 cuts the double-sided adhesive tape 22 let out from the aperture 17 in a desired length to form a label with desired characters printed thereon. The cutter mechanism 14 consists of a fixed blade and a movable blade which contacts and slides on the fixed blade. The cutter mechanism 14 cuts the film 18 by the movable blade driven by the DC motor 33 while binding the film 18 between the blades.

Referring to FIG. 2, the printing unit 3 has a cover 34 covering tape cassette 8 set in the tape installation unit 9. The tape cassette 8 is exchanged while the cover 34 is open.

As shown in FIG. 1, there is a control device 35 in the body 1. The control device 35 is constructed around a microcomputer chip, and comprises a CPU 36, ROM 37 and RAM 38. The key board 4, the LCD driving circuit 39 to drive the LCDs, the pulse motor driving circuit 40 to drive the pulse motor 15, DC motor driving circuit 41 to drive the DC motor 33, and the thermal head driving circuit 42 to drive the thermal head 12 are connected to the CPU 36.

The ROM 37 stores data for a character generator, for display and for print purposes and various control programs. The RAM 38 has a storage area for storing character data and the image buffer 38a for storing print image data synthesized according to data retrieved from the character generator. The CPU 36 spreads the print image data on the image buffer 38a (illustrated in FIG. 5) when the control device receives a print execution command.

Figure 4A:
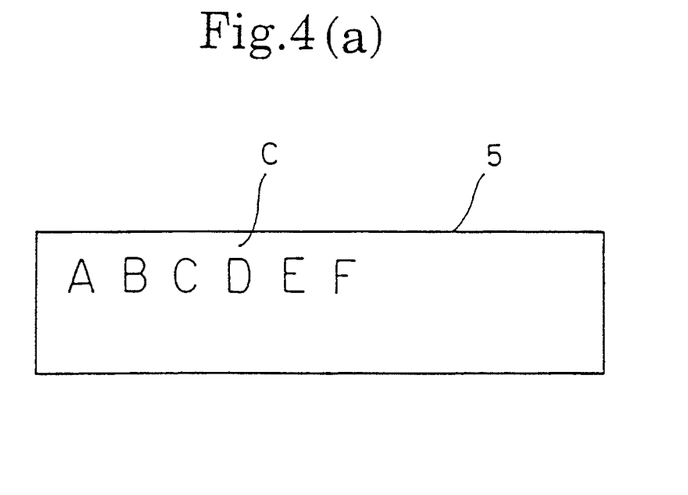
FIG. 4(a) is an LCD displaying characters.

Pressing the character key 6 on the keyboard 4 and selecting characters, for example "ABCDEF" causes the LCD 5 to display characters C as shown in FIG. 4(a) and the data of the characters is stored in the RAM 38. In this process, an operator can edit the character data by typing the keyboard 4 while confirming the characters which appear on the LCD 5.

Pressing the function key 7 initiates the process of data transfer and synthesis. The image data corresponding to the characters C is spread on the image buffer 38a. The thermal head 12, the pulse motor 15, and the DC motor 33 are driven to print characters C on the film 18.

The control device 35 prints an overall frame F1 enclosing all the characters (shown in FIG. 5 and FIG. 6(a), 6(b) and 6(c)) or a partial frame F2 enclosing some of the characters (shown in FIG. 5 and FIG. 6(a), 6(b) and 6(c)) depending on the operation on the keyboard 4. This function will be illustrated more in detail with flowcharts.

Figure 8A:
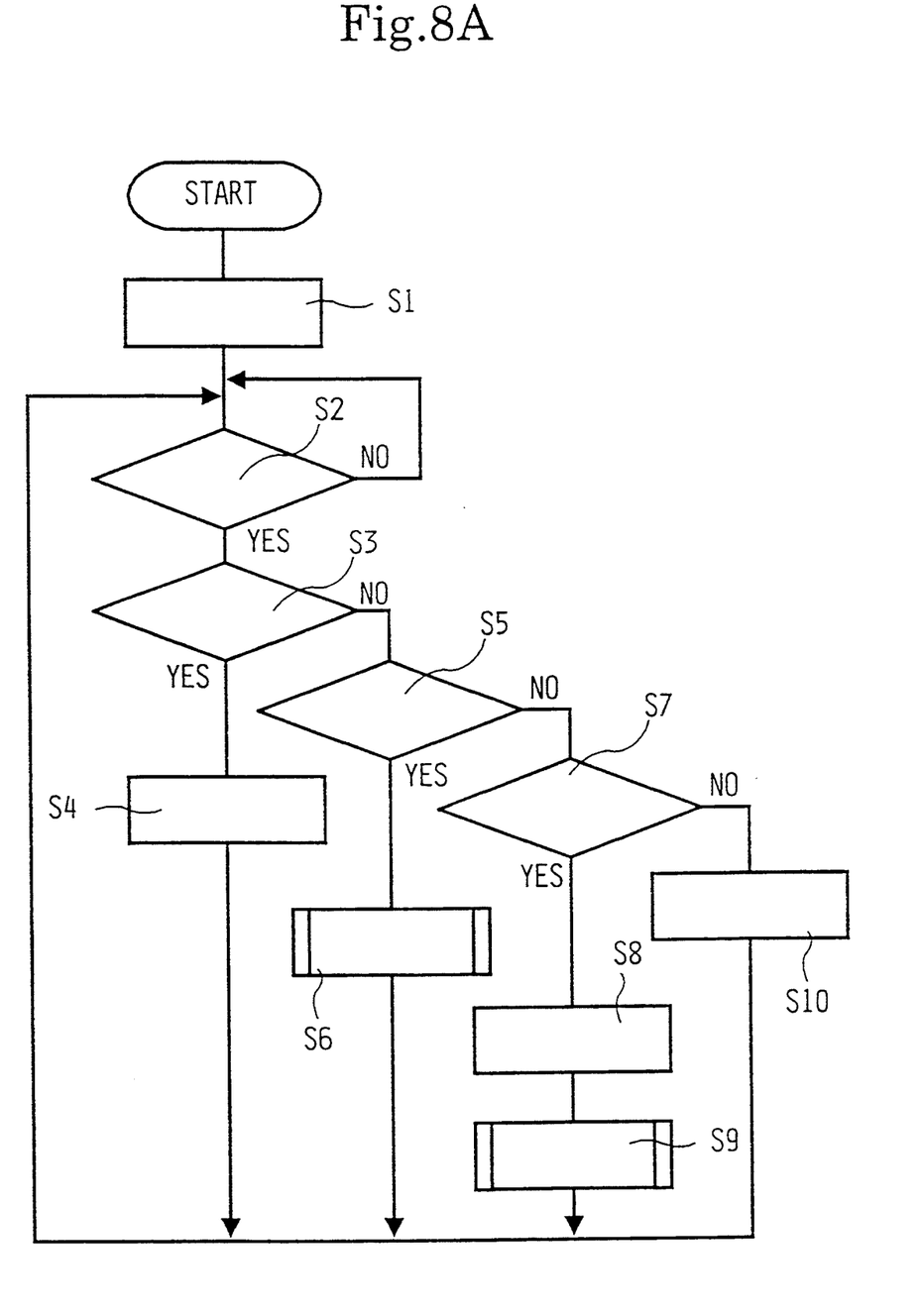
FIG. 8A is a flowchart which embodies the invention.
Figure 8B:
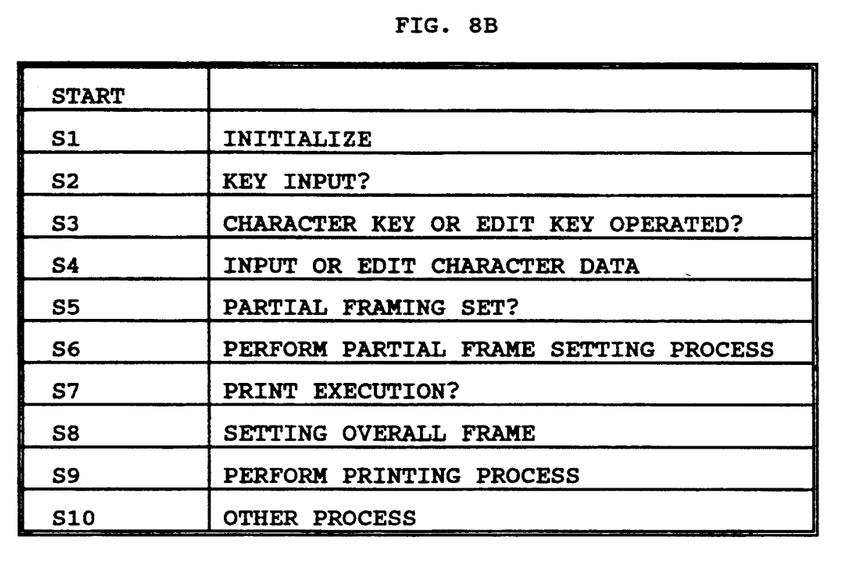
FIG. 8B is a table listing the steps of the flowchart of FIG. 8A.
Figure 9A:
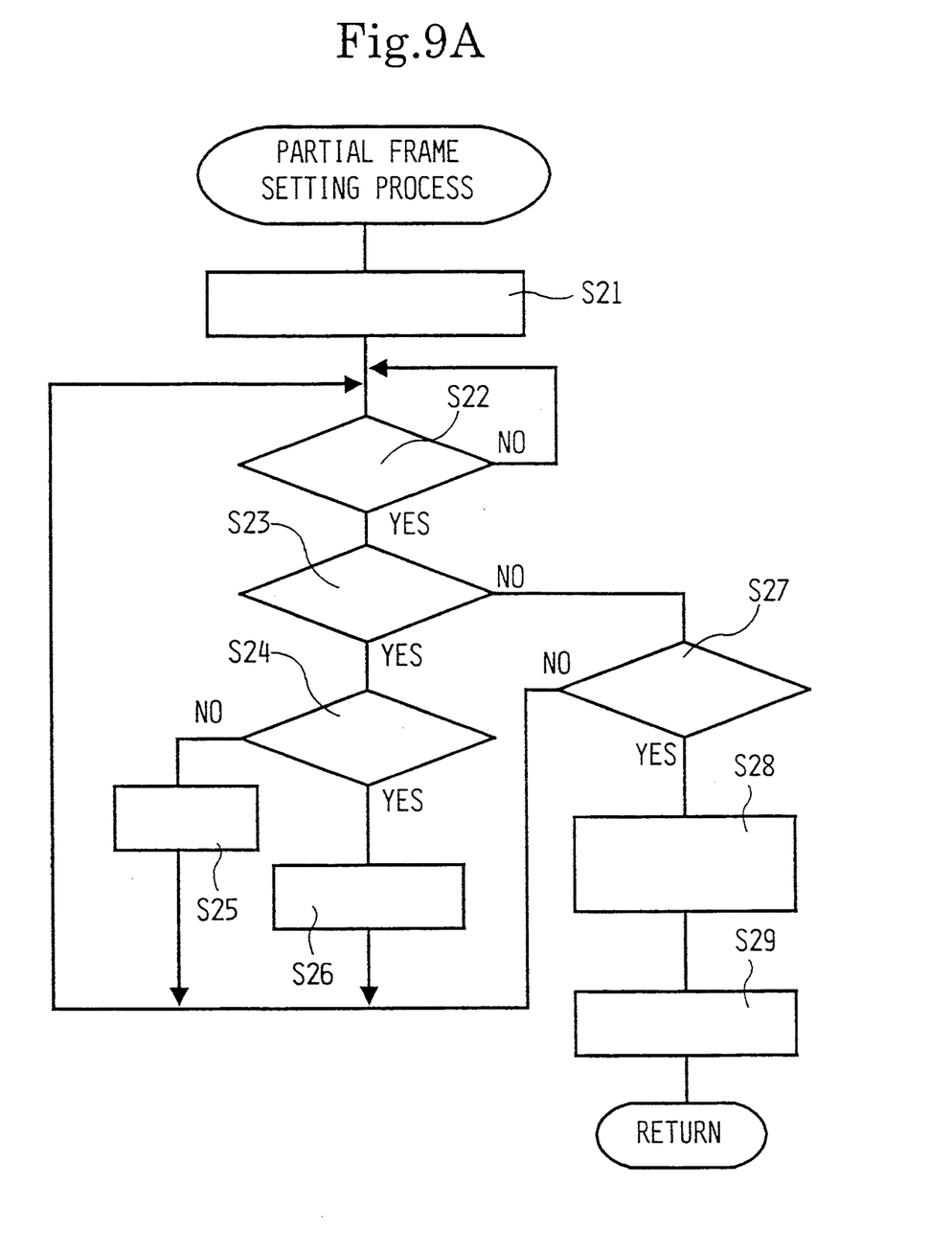
FIG. 9A is a flowchart of partial frame setting functions.
Figure 9B:
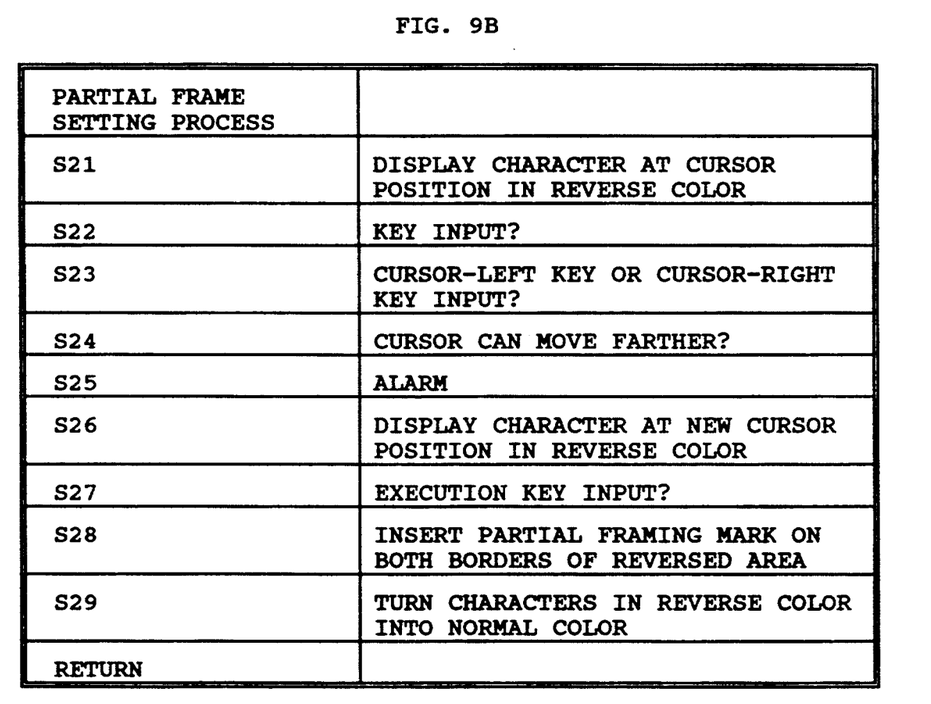
FIG. 9B is a table listing the steps of the flowchart of FIG. 9A.
Figure 10A:
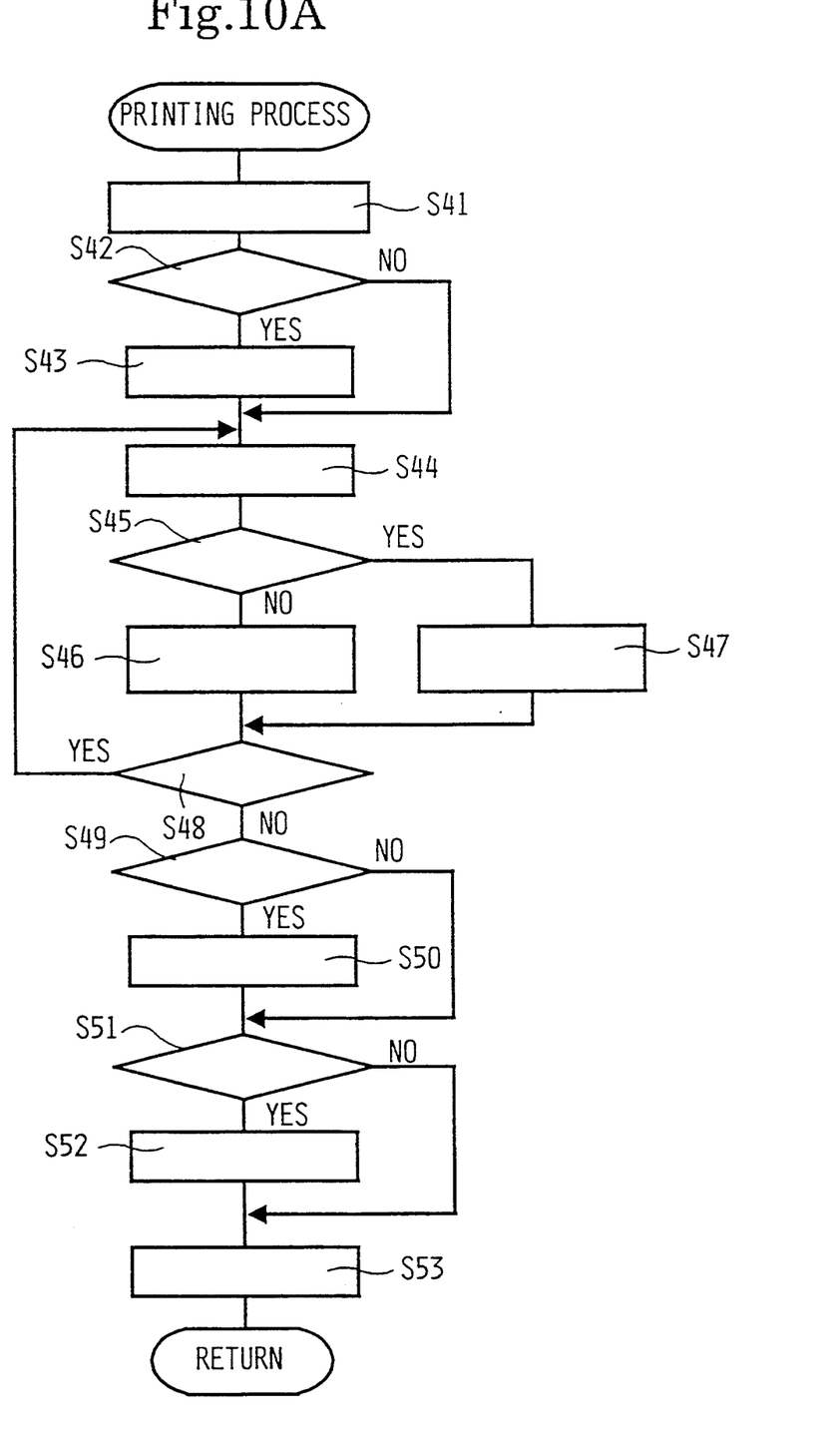
FIG. 10A is a flowchart of a printing function.
Figure 10B:
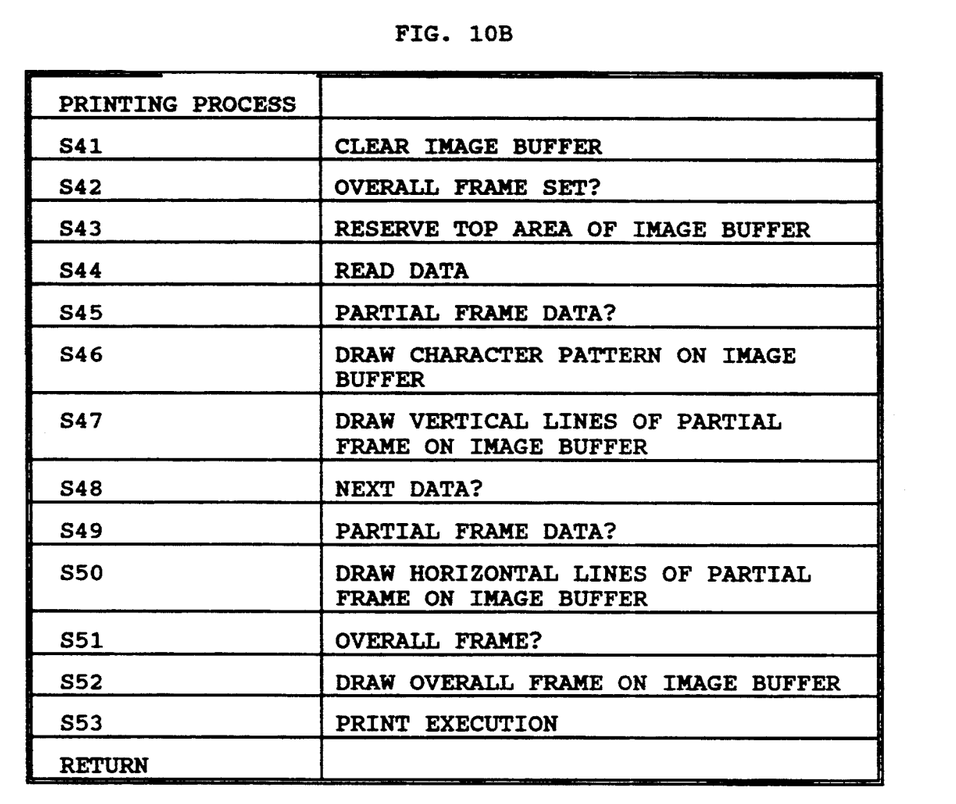
FIG. 10B is a table listing the steps of the flowchart of FIG. 10A.

The operation of the above construction is as follows. Turning on the power switch of the tape printing device automatically invokes the procedure shown in the flowchart of FIG. 8. Flowcharts FIG. 9A and FIG. 10A illustrate details of the partial frame setting process (S6) and the print process (S9) in FIG. 8A respectively.

Figure 6A:
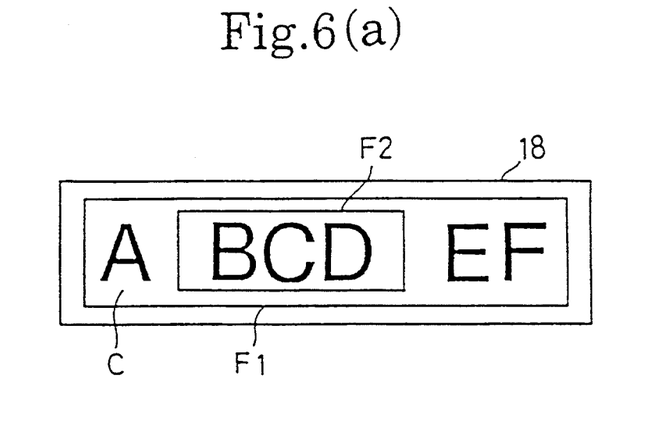
FIGS. 6(a), 6(b) and 6(c) are charts depicting sample printings on films.

The operation of the printing device is described by taking an example shown in FIG. 6 (a). Referring to FIG. 6 (a), the printing device prints characters with an overall frame option and a partial frame option. In this example, an overall frame encloses all the characters while a partial frame encloses characters "BCD" in the characters C.

Figure 7:
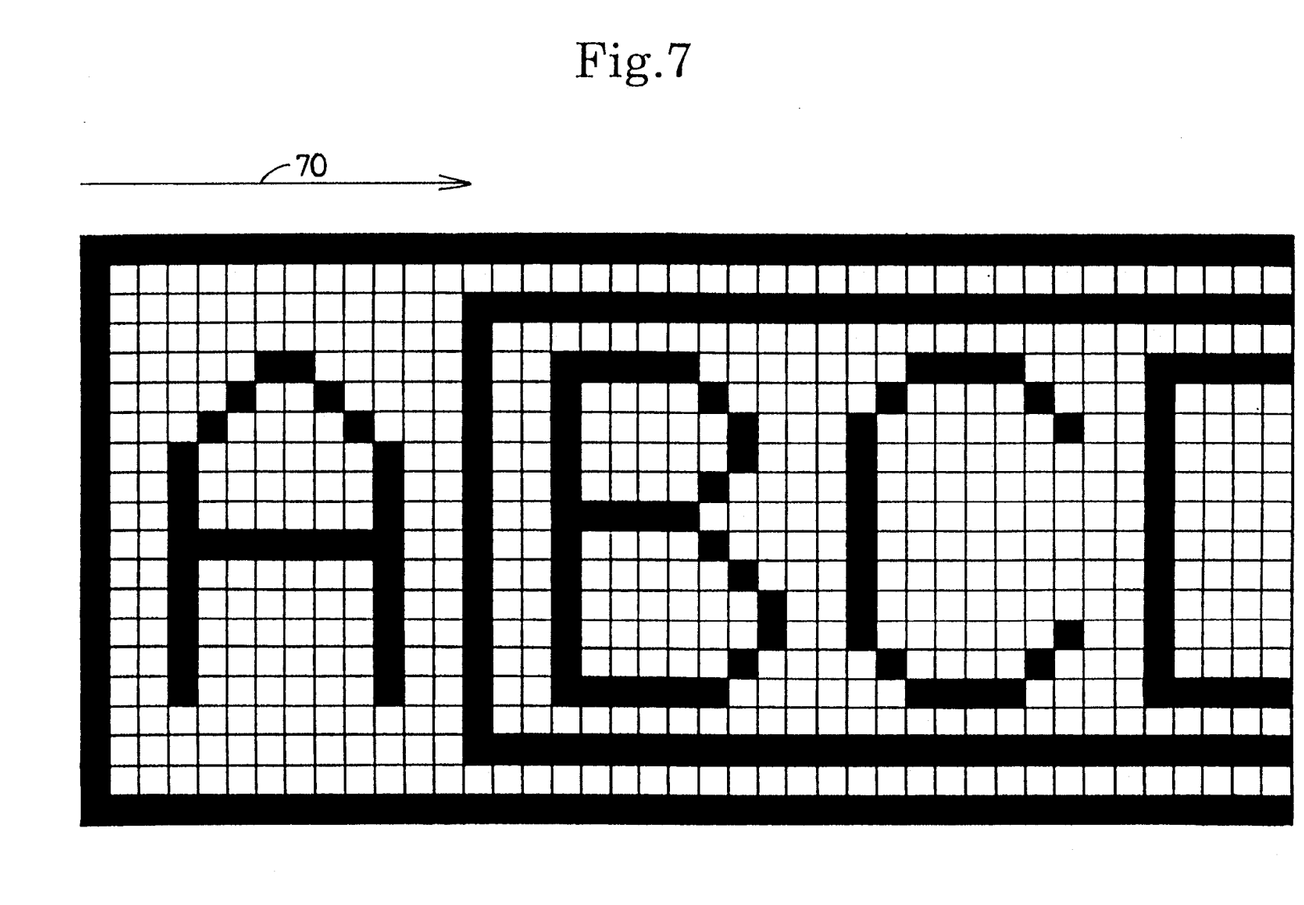
FIG. 7 is a chart depicting the contents of the image buffer.

The printing process realized in this embodiment is illustrated in FIG. 7. Each bit of image data stored on the image buffer 38a corresponds to an individual dot to be printed on a medium. Each small square shown in FIG. 7 represents one bit of memory, wherein the value stored in each bit decides whether or not a corresponding dot should be printed on a medium. The CPU 36 allocates print patterns for characters and frames by setting or resetting these bits.

A plurality of bits correspond to a column substantially extending across the width of a print medium, and the number of bits on a column equals the number of thermal units aligned on the thermal head 12. The image buffer 38a has a storage capacity for storing at least a column of bits so that a column can be printed on a tape medium at a time.

When the printing process is invoked, the CPU scans the image buffer 38 column by column in the direction indicated by an arrow 70 in FIG. 7, and transfers the image data to the thermal head driving circuit 42. The thermal head 12 prints a plurality of dots on a printing medium according to a data transferred from the image buffer 38a. By iterating the data transfer, the printing device of this embodiment realizes a function of printing various fonts and frames on a tape medium.

As illustrated above, the printing device of this embodiment performs printing while sending the print medium in one direction, achieving simple realization of the printing function.

Applying power to the printing device starts the initialization process (S1) and the device gets ready to sense key inputs (S2). If an operator inputs characters C by typing the character key 6 on the keyboard 4 or presses the editing key for editing characters (Yes in S2 and S3), the process of inputting characters or editing characters is executed (S4). Following the example given above, characters "ABCDEF" input by an operator by pressing the character key 6 appear on the LCD 5 as shown in FIG. 4 (a).

Pressing the function key 7 after the process of inputting and editing characters (Yes in S2, No in S3, and Yes in S5) invokes a partial frame selecting process in the next step S6. An operator can set a partial frame by operating setting keys after selecting a character to be enclosed by a cursor. It is also possible to select a plural number of characters to be enclosed by setting a cursor on an end of the text.

Referring to FIG. 9A, the partial frame setting process displays characters in reverse color (S21), and enables the key sensing process (S22). The reverse text corresponds to the area to be enclosed by a partial frame F2. Pressing the execution key in this stage sets only one character to be enclosed by a partial frame (Yes in S22, No in S23, and Yes in S27). A partial frame around a plural number of characters can be set by operating the cursor across desired characters (Yes in S22 and S23).

Pressing the cursor key sends the cursor to an adjacent character from the character currently displayed in reverse color. In this stage, an error warning is issued with an alarm when there is no characters in a direction selected by the cursor key (S25). If there is a character in the direction selected by the cursor key (Yes in S23), the character currently pointed by the cursor turns to the reverse color (S26).

Figure 4B:
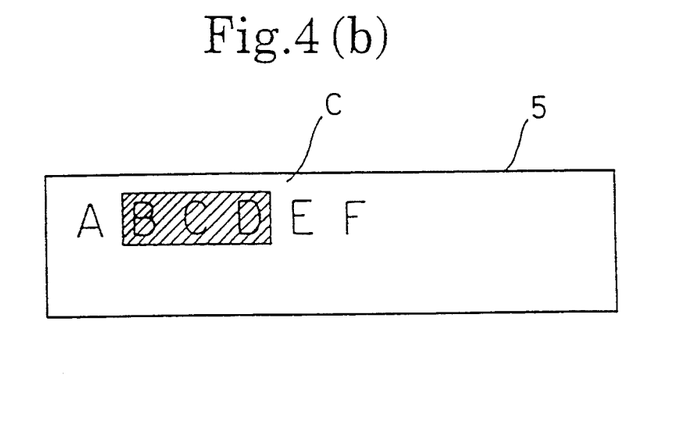
FIG. 4(b) is an LCD displaying the mode of setting a partial frame.

In the above operation, for example, setting a partial frame occurs by pointing to character "B" with the cursor, and then, pressing the cursor-right key two times to send the cursor to the right reverse the color of characters "BCD" in characters C. In FIG. 4(b), the area in reverse color is hatched for convenience. Pressing the cursor-left key in this stage turns the character "D" to normal color.

Figure 4C:
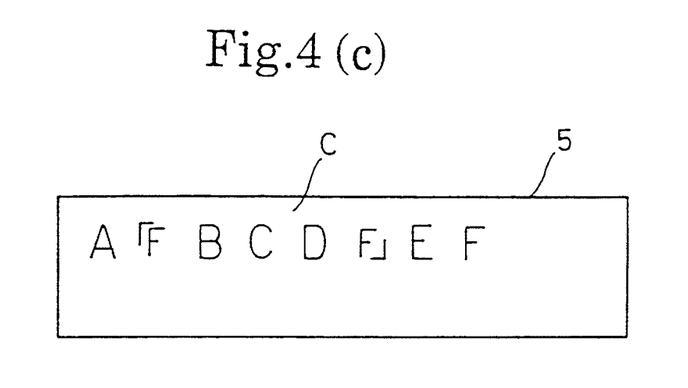
FIG. 4(c) is an LCD displaying the partial framing marks.

As shown in FIG. 4 (c), pressing the execution key with all the desired characters to be enclosed in reverse color (Yes in S22, No in S23 and Yes in S27) causes the LCD 5 to insert a partial framing mark (a bracket and a character "F") at either end of the selected text. In this case, it is obvious that a partial framing mark is inserted either between "A" and "B" and between "D" and "E" on the character storage area of the RAM 38.

After the partial framing operation, the printing device resumes the process in the flowchart FIG. 8A. Pressing the function key 7 to initiate the print procedure (Yes in S2, No in S3 and S5, and Yes in S7) invokes the next step S8 in which various conditions for printing are set. Among these conditions is a software switch to decide whether or not to select an overall frame F1. In this example, the overall frame F1 is enabled by the switch.

After the above setting, pressing the execution key invokes a printing process (S9). The detail of the process is described in FIG. 10A. If the execution of the printing process is not selected in the flowchart of FIG. 8A (Yes in S2, No in S3, S5, and S7), other process is executed (S10).

Figure 5:
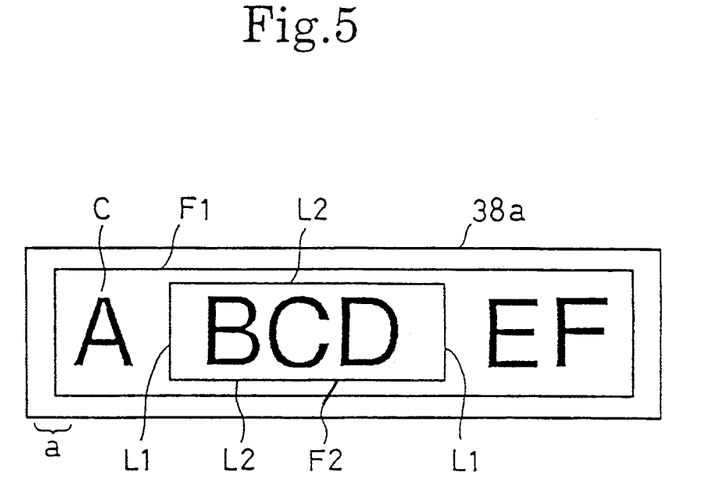
FIG. 5 is a chart conceptually depicting contents of the image buffer.

As shown in FIG. 10A, a print image is spread on the image buffer 38, and the printing process is executed according to the data. FIG. 5 conceptually embodies the image buffer 38a, and is referred to hereon.

In step 41, contents of the image buffer are cleared. In the next step 42, a software switch storing the condition regarding the overall framing option is examined. If the overall frame is active, an area "a" for storing an overall frame is assigned in the top area of the image buffer 38a. The area is assigned by, for example, adding an offset to a pointer value.

Subsequently, in step 42, the data stored in the character storage area of the RAM 38 is retrieved one by one. In this process, if the data represents a character (No in step 45), the character generator interprets the data into print pattern. The print pattern data is allocated on the image buffer 38a (S46). In the above example, the print pattern data for the character "A" follows immediately after the area "a".

Otherwise, if the data is found to be partial framing data (Yes in S45), the data corresponding to the hatched portion of the partial framing F2 is allocated on the image buffer 38a (S47). This process is iterated until all the data is read out and the character storage area becomes empty (S48). Consequently, the print pattern for the characters C and vertical lines L1 of the partial frame F2 are allocated on the image buffer 38a.

In the above example, print patterns for a vertical line L1, characters "B", "C", "D" a vertical line L1, and characters "E", "F" follow the print pattern for the character "A" in that sequence.

After the data allocation, presence of the data for the partial framing F2 is examined in step 49. If there is any data of the category (Yes), a rectangle is drawn by connecting both ends of the two vertical lines with two horizontal lines (S50).

In the next step 51, an optional condition for selecting overall framing is checked. If the option is found to be active (Yes in S51), a print pattern for the overall framing F1 is allocated on the image buffer 38a (S52). In this process the image data for the vertical lines of the overall framing F1 is allocated on the area a.

After the above process, print patterns for the characters "ABCDEF" of characters C, an overall framing F1, and a partial framing F2 are allocated on the image buffer 38a. In step S53, a printing process is carried out based on the data stored on the image buffer 38a.

In the printing process, characters "ABCDEF" of characters C, an overall framing F1, and a partial framing F2 are printed on the film 18, thus forming a label with double framing.

Figure 6B:
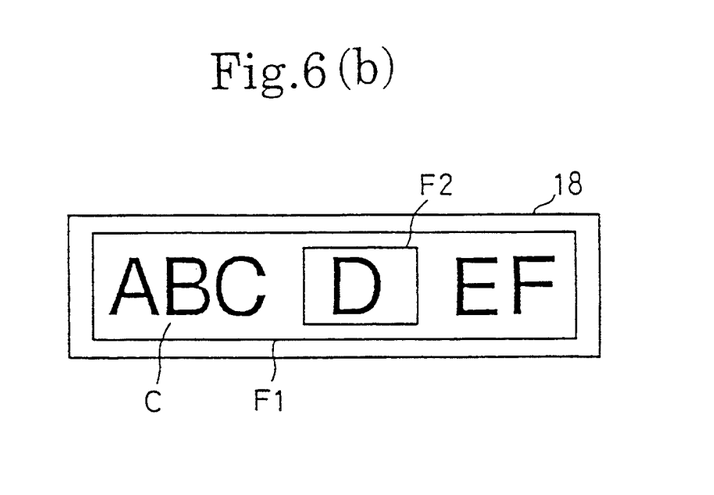
Figure 6C:
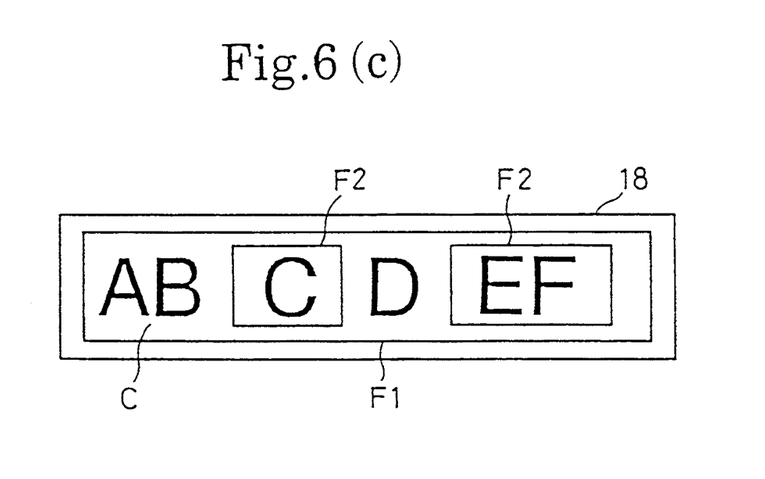

Besides the above examples, an operator can make a choice among a number of options in carrying out printing, that is, setting a partial framing F2 around a particular character as shown in FIG. 6(b) or setting two partial framings F2 as in FIG. 6(c). It is also obviously possible to set either overall framing F1 or partial framing F2 alone on a label, or print character C without any frames.

As mentioned above, the described embodiment can print not only characters C but also overall framing F1 enclosing the entire text, partial framing F2 enclosing particular characters, or double framing F1 and F2. This embodiment allows an operator to set options to enhance the impressions of printed labels in various ways, which is made possible by adding novel functions to conventional devices having only alternative options of whether or not to assign an overall frame around the entire text.

As apparent from the above description, according to the printing device of the present invention, the printing device can print, for example, only characters, characters with an overall framing enclosing entire text, characters with a partial framing around particular characters, or characters with a double framing including an overall and a partial framing, thereby giving operators various options to enhance the impressions of printed labels.

Although the description above employs a transparent film 18 as a print medium, the print medium may be a paper tape or the tape may not have a double sided adhesive tape secured thereto.

The description of the invention contains many specifics, however, these should not be construed as limiting the scope of the invention. It is also noted that various modifications can be made without departing from the spirit and scope of the present invention.

What is claimed is:

1. A tape printing device for printing an image on tape medium, comprising:
   input means for inputting image data including character data;
   memory means for storing the image data;
   partial frame selecting means for selecting portions of the image data for framing in a partial enclosed frame and storing data corresponding to the selected portions in said memory means;
   overall frame selecting means for selecting an overall enclosed frame for the image that overlaps and encompasses at least part of the selected portions of the image in the partial enclosed frame and storing data corresponding to an overall enclosed frame in said memory means;
   display means for displaying image data input from said input means and for displaying the selected portions of the image data for the partial enclosed frame, wherein said display means includes a partial frame display means for displaying which characters are selected to be partially framed and for indicating boundaries of the selected partial frame; and
   print means for retrieving data from said memory means and printing the image, the partial enclosed frame and the overall enclosed frame on the tape medium based on the data retrieved.

2. The tape printing device of claim 1, wherein said memory means comprises an input memory for storing image data input from said input means and an image buffer for storing image data retrieved from said input memory, the selected portions of image data for the partial frame and the overall frame as print image data.

3. The tape printing device of claim 2, further comprising an image data transferring means for transferring image data from said input memory to said image buffer.

4. The tape printing device of claim 3, wherein said image data transferring means allocates the image data transferred from said input memory as a print pattern in said image buffer.

5. The tape printing device of claim 1, wherein said display means includes a character display displaying characters derived from the character data input from said input means and displays a mark indicating the partial frame.

6. The tape printing device of claim 1, wherein said print means includes combining means for combining the data corresponding to the selected portions for the partial frame and the data corresponding to the overall frame stored in said memory means for printing.

7. The tape printing device of claim 1, further comprising editing means for editing the data input from said input means.

8. A tape printing device for printing an image on a tape medium, comprising:
   a housing having receiving means for receiving a tape cassette with tape medium;
   input means coupled to said housing for inputting image data including character data;
   memory means coupled to said housing for storing the image data;
   partial frame selecting means coupled to said housing for selecting portions of the image data for framing in a partial enclosed frame and storing data corresponding to the selected portions in said memory means;
   overall frame selecting means coupled to said housing for selecting an overall enclosed frame for the image that overlaps and surrounds the selected portions of the image in the partial enclosed frame and storing data corresponding to an overall enclosed frame in said memory means;
   display means coupled to said housing for displaying image data input from said input means and for displaying the selected portions of the image data for the partial enclosed frame, wherein said display means includes a partial frame display means for displaying which characters are selected to be partially framed and for indicating boundaries of the selected partial frame;
   print means coupled to said housing for retrieving data from said memory means and printing the image, the partial enclosed frame and the overall enclosed frame on the tape medium based on the data retrieved;
   a removable tape cassette housing tape medium removably coupled to said receiving means;
   a tape feeding means in said housing for feeding said tape medium from said tape cassette to said print means; and
   a feed control means coupled to said housing for controlling feeding of said tape medium to said print means.

9. The tape printing device of claim 8, wherein said tape medium includes a printing tape and a double sided adhesive strip secured to said tape.

10. The tape printing device of claim 8, wherein said print means includes an array of thermal print heads.

11. The tape printing device of claim 8, wherein said memory means comprises an input memory for storing image data input from said input means and an image buffer for storing image data retrieved from said memory means, the selected portions of image data for the partial frame and the overall frame as print image data.

12. The tape printing device of claim 11, further comprising an image data transferring means for transferring image data from said input memory to said image buffer and for allocating the image data transferred from said input memory as a print pattern in said image buffer.

13. The tape printing device of claim 8, wherein said print means includes combining means for combining the data corresponding to the selected portions for the partial frame and the data corresponding to the overall frame stored in said memory means for printing.

14. The tape printing device of claim 8, further comprising warning means coupled to said housing for warning an operator when the selected partial frame encompasses an area without characters.

15. The tape printing device of claim 8, further comprising editing means coupled to said housing for editing the data input from said input means.

16. A method of printing an image on a tape medium in a tape printing device, comprising the steps of:
   inputting image data;
   storing the image data in a memory;
   editing the image data stored in the memory;
   selecting an overall frame and storing data relating to the selection in the memory;
   selecting a partial frame around a selected portion of the image having at least portion that is overlapped and encompassed by the overall frame and storing data relating to the selected portion in the memory;
   displaying input image data and the selected portion of the image data to be partially framed by indicating boundaries of the selected partial frame; and
   printing the image, selected partial frame and selected overall frame on the tape medium.

17. The method of claim 16, wherein the steps of selecting the partial frame and the overall frame include selecting from a group of options including no frame, a partial frame only, an overall frame only and both a partial frame and an overall frame.

18. The method of claim 16, wherein the step of storing the image data includes the steps of storing the image data in an input memory, transferring the image data from the input memory to an image buffer and allocating the image data transferred from the input memory as an image pattern in the image buffer.

* * * * *